June 14, 1960     E. B. FERNBERG     2,940,145
FASTENER FOR INSIGNIA

Filed March 6, 1957     2 Sheets-Sheet 1

Inventor
Eric Birger Fernberg
by
attorney

June 14, 1960 E. B. FERNBERG 2,940,145
FASTENER FOR INSIGNIA

Filed March 6, 1957 2 Sheets-Sheet 2

Inventor
Eric Birger Fernberg
by Malcolm W. Fraser
attorney

United States Patent Office 2,940,145
Patented June 14, 1960

2,940,145
FASTENER FOR INSIGNIA
Eric Birger Fernberg, Northwood, England, assignor to F.T. Products Limited, London, England, a company of Great Britain Filed Mar. 6, 1957, Ser. No. 644,357
Claims priority, application Great Britain, Mar. 8, 1956
2 Claims. (Cl. 24—81)

The present invention relates to an improved fastener and an assembly of fastener used to secure a rod-like member in an aperture in a support.

An object of this invention is to provide a simple and efficient fastener for securing a letter, name plate or other insignia formed with a stud, to a panel.

The invention is particularly useful in the automobile industry for securing a plate bearing the name of the manufacturer to a portion of the car body. Instead of one plate bearing the whole name of the manufacturer, each letter in the name may be attached in the manner described below.

Another object of the invention is to provide means whereby each such insignia may be held in its aperture in such a way that it can be adjusted in position into alignment with its neighbours.

Preferred forms of my invention are illustrated in the accompanying drawings, in which.

Figure 1:
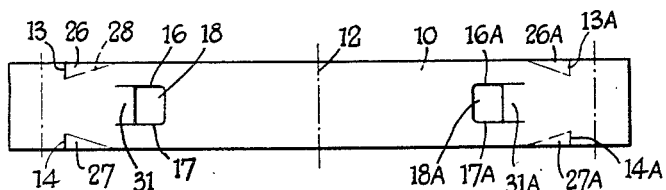
Figure 1 is a plan of a blank from which a fastener may be formed.

At 10 in Figure 1 is shown a blank consisting of a strip of spring steel sheared to the shape shown and from which is formed the fastener indicated generally at 11 in Figures 2 to 5.

It will be seen that the blank is symmetrical about a line 12 and each half has two shear cuts 13 and 14 or 13A and 14A cut out of its edges. Each half of the blank is also formed with longitudinal shear cuts 16 and 17 or 16A and 17A and from between the cuts is cut away a rectangular area 18 or 18A.

Figures 2, 3:
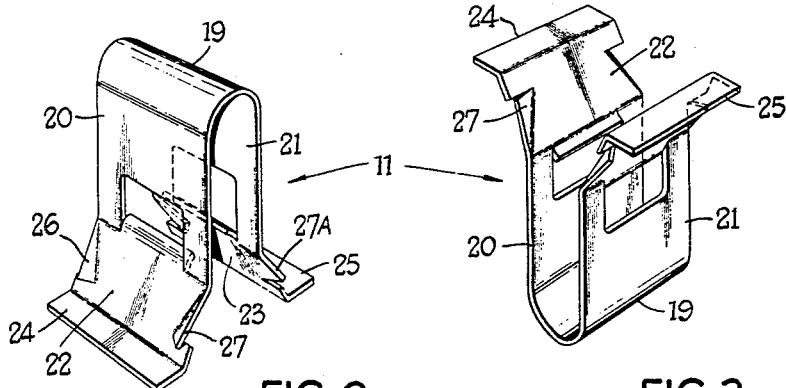
Figures 2 and 3 are perspective views of the finished fastener taken from above and below respectively.

When so blanked out the strip 10 is bent to the U-shape shown in Figures 2 and 3 so as to have a curved nose 19, a pair of flat limbs 20 and 21 which towards their lower ends splay outwardly as at 22 and 23, terminating in a pair of outwardly directed feet 24 and 25.

Referring again to Figure 1, the prongs formed at 26 and 27 or 26A and 27A are bent outwardly a little along a diagonal line such as that shown at 28 in Figure 1, so that in the final form of the fastener the prongs are directed outwardly with respect to the U.

The metal portions 31, 31A left between the shear cuts 16 and 17, or 16A and 17A, are also bent out of the general plane of the strip (but on the opposite side from the prongs) to form lugs, which may have square-nosed ends, as shown in Fig. 1 before the lugs are bent, directed inwardly with respect to the U.

Such a fastener may be used with advantage in the automobile industry to attach a single letter- or name-plate 32 to a panel 33 forming part of the automobile. For this purpose the panel is formed with an aperture 34 which may be circular or any other convenient shape and through which the limbs 20, 21 of the U may just pass with clearance.

The name plate may have the letter painted or enamelled on, or may be engraved, or (as shown) may be embossed thereon as at 35. On its rear side the plate is formed with an integral stud 36 of rectangular section and at the base of the stud the plate is recessed to accommodate the feet 24, 25 of the fastener.

Figures 4, 5:
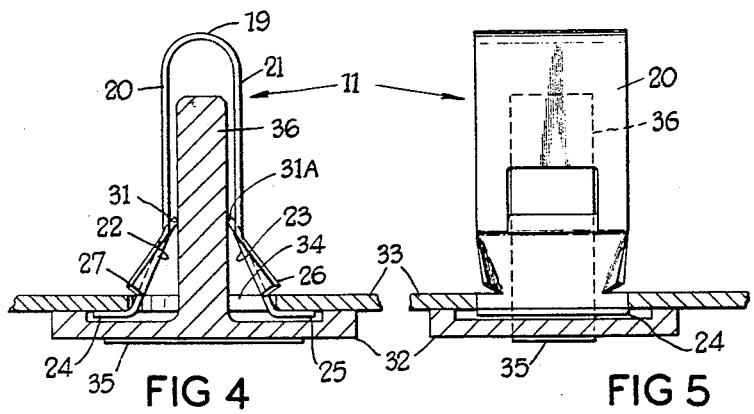
Figures 4 and 5 are side and front elevations respectively, each partly in section, of the same fastener in assembled position securing a letter plate to a panel.

The fastener is used in the following way:

It is pushed nose first through the aperture 34 until the prongs 26, 27 etc. engage the edges of the aperture, whereupon the limbs 20, 21 move together and allow the prongs to snap over the edges of the aperture. Then the stud 36 of the letter-plate is pushed through the aperture until it is gripped by the lugs 31 and 31A, the resilience of the fastener allowing the stud to be pushed fully home, in which position the rear face of the plate touches the panel as shown in Figures 4 and 5.

Owing to the sharp straight edges of the lugs 31, 31A the stud cannot be pulled back out of the fastener except with the use of considerable force.

Figure 6:
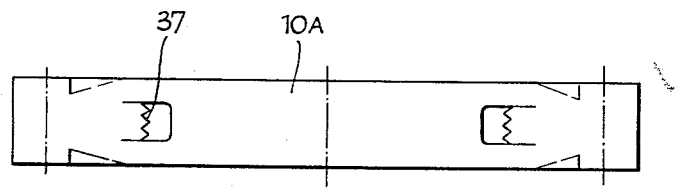
Figure 6 is a plan of a modified blank from which a fastener may be formed.

Fig. 6 shows a modification in which the blank 10A is used to make the fastener, and in which the metal portions corresponding to the metal portions 31 and 31A of Fig. 1 are provided with teeth, one of the toothed metal portions being indicated by the reference number 37.

What I claim is:

1. A fastener for securing a parallel-sided rod-like member in spaced relation to an aperture in a sheet-like support, comprising a single strip of spring material bent to U-shape so as to have a pair of limbs the major part of which is flat and having the edges thereof defining an unobstructed space, an inwardly directed lug in each of said limbs having a nose portion which extends over a major portion of the transverse width of said limbs, whereby the nose portions of said lugs are adapted to firmly engage against opposite flat sides of the rod-like member to thereby prevent the rotation of the rod-like member while permitting limited linear movement of the rod-like member parallel to the transverse width of said lugs in the unobstructed space between said limbs, outwardly directed feet on the ends of said limbs, respectively, and an outwardly directed pointed prong sheared and bent out of an edge of each of said limbs adjacent a foot, the point of the prong in each of said limbs being disposed between said lug and the foot of its associated limb and nearer to the foot than to the nose portion of said lug.

2. In combination, a parallel-sided rod-like member and a fastener for mounting said member in spaced relation to an aperture in a sheet-like support, said fastener comprising a single strip of spring material bent to U-shape so as to have a pair of limbs the major part of which is flat and having the edges thereof defining an unobstructed space, an inwardly directed lug in each of said limbs having a nose portion which extends over a major portion of the transverse width of said limbs, whereby the nose portions of said lugs are adapted to firmly engage against opposite flat sides of said rod-like member to thereby prevent the rotation of the rod-like member while permitting limited linear movement of the rod-like member parallel to the transverse width of said lugs in the unobstructed space between said limbs, outwardly directed feet on the ends of said limbs, respectively, and an outwardly directed pointed prong sheared and bent out of an edge of each of said limbs adjacent a foot, the point of the prong in each of said limbs being disposed between said lug and the foot of its associated limb and nearer to the foot than to the nose portion of said lug.

References Cited in the file of this patent

UNITED STATES PATENTS

| 2,295,444 | Woodward | Sept. 8, 1944 |
| 2,368,027 | Johnson | Jan. 23, 1945 |
| 2,389,897 | Davis | Nov. 27, 1945 |

FOREIGN PATENTS

| 1,028,266 | France | Feb. 25, 1953 |